United States Patent
Guarino

(10) Patent No.: US 10,989,297 B2
(45) Date of Patent: Apr. 27, 2021

(54) ELECTRIC POWERTRAIN WITH SUN BEARING

(71) Applicant: Ford Global Technologies, LLC, Dearborn, MI (US)

(72) Inventor: William David Guarino, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 16/516,855

(22) Filed: Jul. 19, 2019

(65) Prior Publication Data

US 2021/0018089 A1  Jan. 21, 2021

(51) Int. Cl.
| | |
|---|---|
| F16H 57/04 | (2010.01) |
| F16H 57/08 | (2006.01) |
| F16H 48/11 | (2012.01) |
| F16H 1/28 | (2006.01) |

(52) U.S. Cl.
CPC .......... *F16H 57/0471* (2013.01); *F16H 1/28* (2013.01); *F16H 48/11* (2013.01); *F16H 57/082* (2013.01)

(58) Field of Classification Search
CPC ........ F16H 57/0471; F16H 48/11; F16H 1/28; F16H 57/082
See application file for complete search history.

(56) References Cited

U.S. PATENT DOCUMENTS

| | | | |
|---|---|---|---|
| 4,189,960 A | 2/1980 | Holdeman | |
| 5,643,127 A | 7/1997 | Yoshii et al. | |
| 6,401,850 B1 * | 6/2002 | Bowen | B60K 6/48 180/65.6 |
| 6,499,549 B2 * | 12/2002 | Mizon | H02K 7/116 180/65.6 |
| 8,348,800 B2 | 1/2013 | Tanaka et al. | |
| 9,388,880 B2 | 7/2016 | Shizu et al. | |
| 2013/0337959 A1 * | 12/2013 | Suzuki | H02K 7/083 475/149 |
| 2014/0141918 A1 * | 5/2014 | Fukami | B60K 17/165 475/150 |
| 2018/0076687 A1 * | 3/2018 | Pritchard | B60K 7/0007 |
| 2018/0180500 A1 | 6/2018 | Hawarden et al. | |

* cited by examiner

*Primary Examiner* — Justin Holmes

(74) *Attorney, Agent, or Firm* — Vincent Mastrogiacomo; Brooks Kushman P.C.

(57) ABSTRACT

An electric powertrain includes an electric machine having a rotor shaft supported for rotation about an axis. A planetary gearset is supported about the axis and includes a sun gear assembly having a sun shaft with a first end connected to the rotor shaft, a second end having a sun gear, and an inner bearing seat disposed therebetween. The planetary gearset further includes a planet carrier having planet gears and defining an outer bearing seat. At least one of the planet gears meshes with the sun gear. The planetary gearset also includes a ring gear meshing with at least one of the planet gears. A sun bearing is supported about the axis and includes an outer race disposed on the outer bearing seat, an inner race disposed on the inner bearing seat, and a plurality of spherical roller elements disposed between the inner and outer races.

19 Claims, 3 Drawing Sheets

ELECTRIC POWERTRAIN WITH SUN BEARING

TECHNICAL FIELD

This disclosure relates to electric powertrains for vehicles and more particularly to electric powertrains mounted coaxially with vehicle axles.

BACKGROUND

Vehicles may include electric powertrains to improve fuel economy and reduce emissions. Electric powertrains utilize a traction motor to power driven wheels of the vehicle. The traction motor may be used in conjunction with an internal-combustion engine in a hybrid vehicle. The traction motor is powered by a traction battery, fuel cell, or other electrical power source.

Electric motors produce usable torque over a broader range of speeds than engines and typically do not require a multi-speed gearbox. Instead, electric powertrains typically include a one-speed gearbox that reduces shaft speed and multiplies torque for the driven wheels. Electric powertrains may be packaged as an electric drive axle (eAxle). Electric powertrains sometimes include multi-speed gearboxes.

SUMMARY

According to one embodiment, an electric powertrain includes an electric machine having a rotor shaft supported for rotation about an axis. A planetary gearset is supported about the axis and includes a sun gear assembly having a sun shaft with a first end connected to the rotor shaft, a second end having a sun gear, and an inner bearing seat disposed therebetween. The planetary gearset further includes a planet carrier having planet gears and defining an outer bearing seat. At least one of the planet gears meshes with the sun gear. The planetary gearset also includes a ring gear meshing with at least one of the planet gears. A differential is configured to receive power from the planet carrier. A sun bearing is supported about the axis and includes an outer race disposed on the outer bearing seat, an inner race disposed on the inner bearing seat, and a plurality of spherical roller elements disposed between the inner and outer races. An inner diameter of the inner race is less than an outside diameter of the sun gear.

According to another embodiment, an electric powertrain includes an electric machine having a rotor shaft supported for rotation about an axis. A planet carrier is supported for rotation about the axis and defining an outer bearing seat. A sun gear assembly is supported for rotation about the axis. The sun gear assembly has a sun shaft with a first end rotationally coupled to the rotor shaft, a second end having a sun gear, and an inner bearing seat disposed therebetween. A sun bearing is supported for rotation about the axis and includes an outer race disposed on the outer bearing seat, an inner race disposed on the inner bearing seat, and a plurality of spherical roller elements disposed between the inner and outer races. an inner diameter of the inner race is less than an outside diameter of the sun gear.

According to yet another embodiment, an electric powertrain includes a housing and an electric machine supported in the housing about an axis. The electric machine has a stator, a rotor shaft supported for rotation about the axis, and a rotor fixed to the rotor shaft. The electric powertrain further includes a stepped planetary gearset including a sun gear assembly supported for rotation about the axis. The sun gear assembly has a sun shaft with a first end splined to the rotor shaft, a second end having a sun gear, and an inner bearing seat disposed therebetween. A ring gear is rotationally fixed to the housing. A planet carrier has planet gears each with first teeth in meshing engagement with the sun gear and second teeth in meshing engagement with the ring gear. The planet carrier defines an outer bearing seat. A differential is configured to receive power from the planet carrier. A sun bearing is supported about the axis and including an outer race disposed on the outer bearing seat, an inner race disposed on the inner bearing seat, and a plurality of spherical roller elements disposed between the inner and outer races. An inner diameter of the inner race is less than an outside diameter of the sun gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
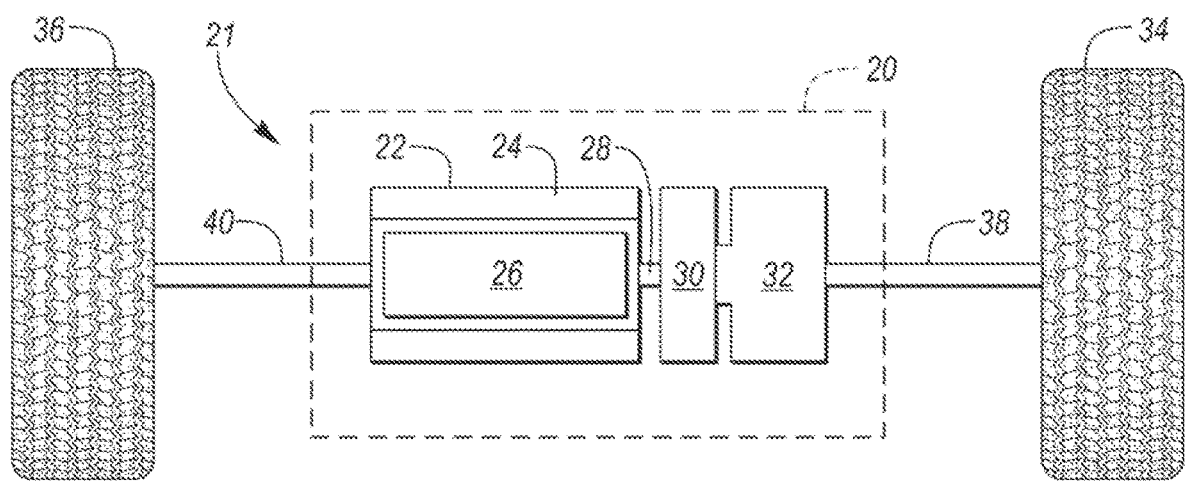
FIG. 1 is a schematic diagram of an electric drive axle of a vehicle.

Referring to FIG. 1, an electric powertrain 20 may be used to power driven wheels of an electrified vehicle, such as a passenger car, truck, sport-utility vehicle, or crossover. In the illustrated embodiment, the electric powertrain 20 is packaged as an electric drive axle (eAxle) that may be used as a front and/or rear drive axle of the electrified vehicle.

The powertrain 20 includes an electric machine 22, typically called a traction motor, that produces drive torque. The traction motor 22 may also act as a generator, such as during regenerative braking. The traction motor 22 may be powered by a traction battery (not shown). The traction motor 22 includes a stator 24 and a rotor 26 supported for rotation within the stator 24. An output shaft 28 of the traction motor 22 is rotationally fixed to the rotor 26. An end portion of the output shaft 28 is coupled to a speed reducer 30 (also known as a transmission or gearbox) configured to reduce speed of the output shaft 28 creating torque multiplication. The speed reducer 30 may have a single, fixed speed ratio (sometimes referred to as a one-speed). An output member of the speed reducer 30 is coupled to a differential 32 configured to distribute the motor power between the first wheel 34 and the second wheel 36. The differential 32 is also configured to permit speed differences between the first and second wheels 34, 36 to facilitate cornering of the vehicle. A first half shaft 38 connects the differential 32 to the first wheel 34, and a second half shaft 40 connects the differential 32 to the second wheel 36. Used herein "half shaft" refers to any shaft that transmits power from a differential to a driven wheel.

Figure 2:
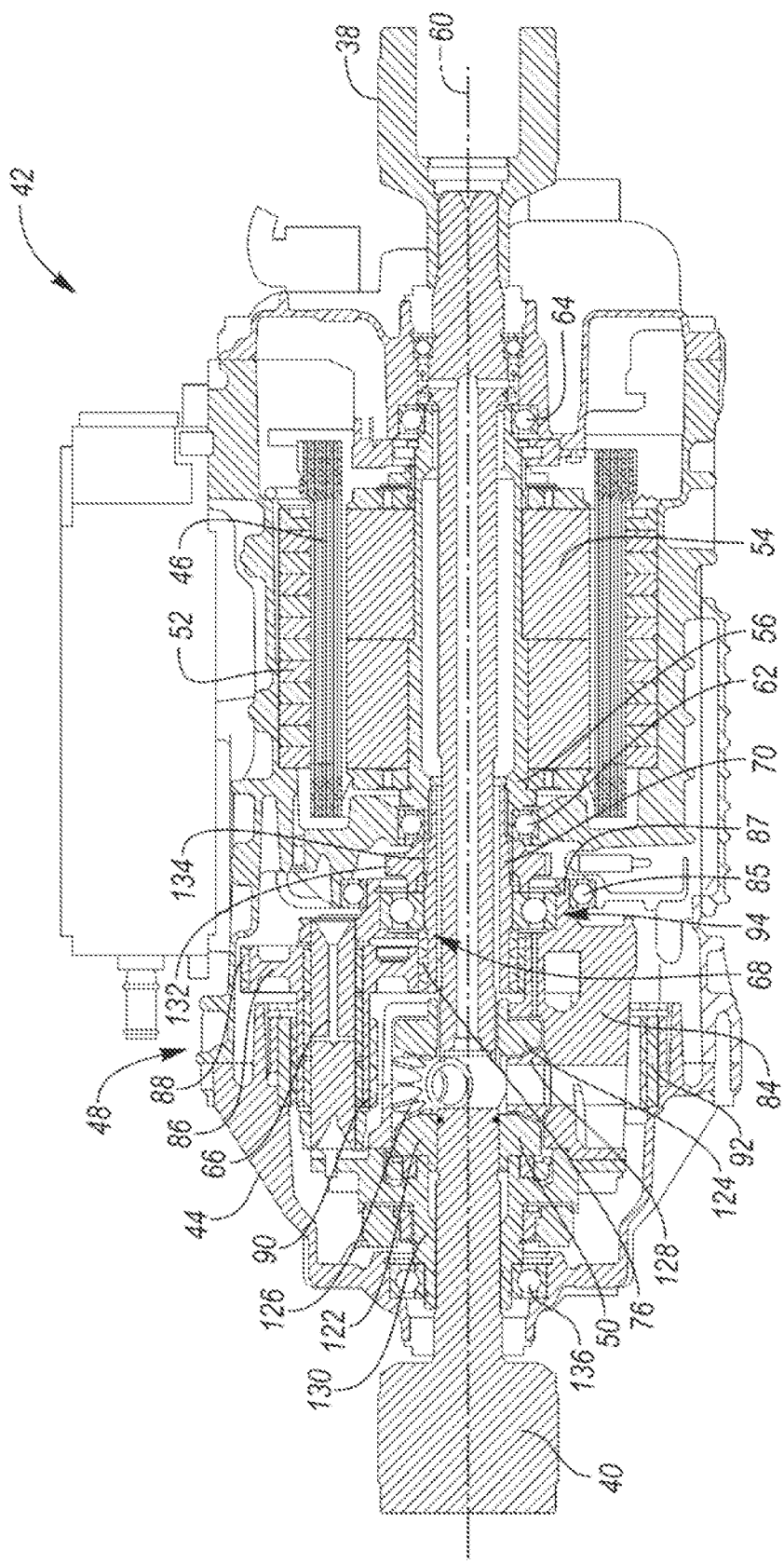
FIG. 2 is an axial cross-sectional view of an electric drive unit of the electric drive axle according to one embodiment.
Figure 3:
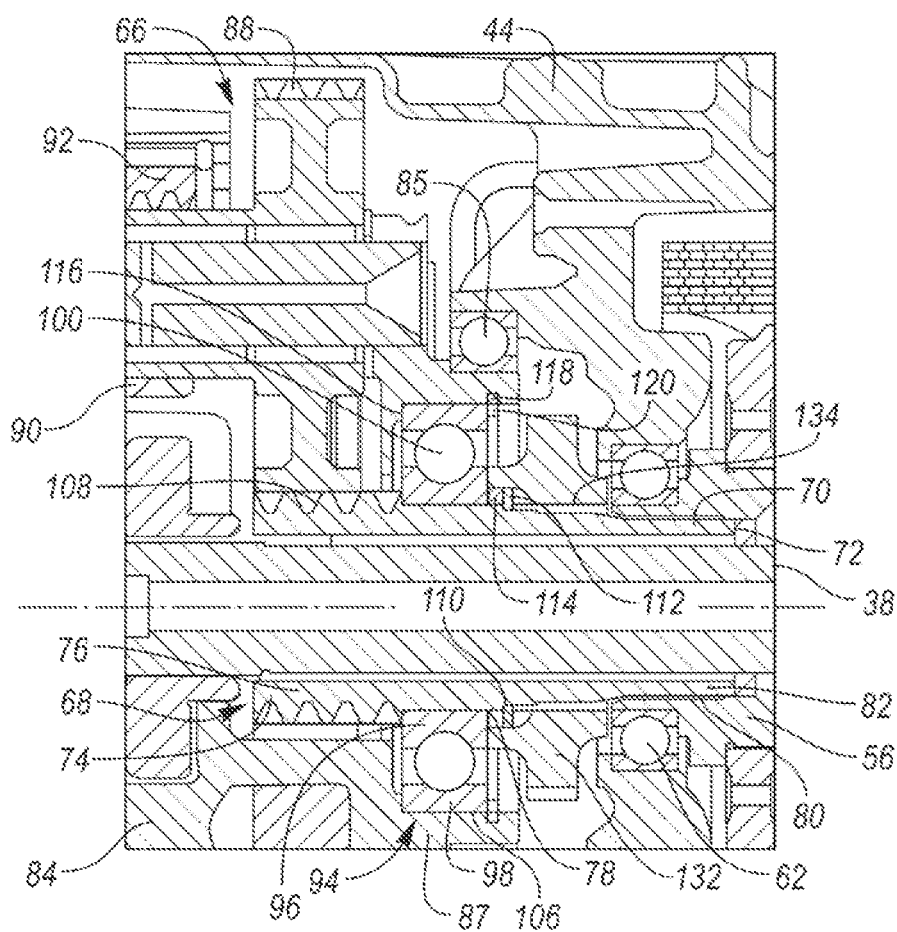
FIG. 3 is a zoomed in view of a portion of the electric drive unit of FIG. 2.

FIGS. 2 and 3 illustrate one example drive unit 42 suitable for use in the powertrain 20. The drive unit 42 has a housing 44. A traction motor 46, a transmission 48, and a differential 50 are supported within the housing 44. The housing 44 may be mounted transversely across the vehicle to be generally coaxial with the half shafts 38, 40. The half shafts 38, 40 define an axis 60 of the drive unit 42. The traction motor 46, the transmission 48, and the differential 50 may be centered on the axis 60. The stator 52 of the motor 46 is rotationally fixed to the housing 44 and the rotor 54 is supported for rotation about the axis 60 via a rotor shaft 56. The rotor shaft 56 is supported by a pair of motor bearings 62 and 64. The motor bearings 62, 64 each include an inner race seated on an outer circumferential surface of the rotor shaft 56 and an outer race seated on a portion of the housing 44.

The transmission 48 is operably coupled to the rotor shaft 56 creating a power flow path. The transmission 48 may include a planetary gearset 66 that reduces the speed of the rotor shaft 56 to provide a final-drive speed. In the illustrated embodiment, the planetary gearset 66 is of the stepped variety, but a simple planetary gearset may also be used. The planetary gearset 66 includes a sun gear assembly 68 supported for rotation about the axis 60. The sun gear assembly 68 includes a sun shaft 70 having a first end 72 connected to the rotor shaft 56, a second end 74 having a sun gear 76, and an inner bearing seat 78 disposed therebetween. The sun shaft 70 may be splined to the rotor shaft 56 so that the sun shaft 70 and the rotor shaft 56 are rotationally coupled and axially movable relative to each other. In one embodiment, the rotor shaft 56 may define internal splines 80 that mesh with external splines 82 of the sun shaft 70, or vice versa. A face spline connection may be used in alternative embodiments. The sun gear 76 may be integrally formed with the sun shaft 70 or may be a separate gear that is rotationally coupled to the sun shaft 70.

The planetary gearset 66 also includes a planet carrier 84 having a plurality of planet gears 86. In the stepped planetary gearset, each of the planet gears 86 has first teeth 88 in meshing engagement with the sun gear 76 and second teeth 90 in meshing engagement with a ring gear 92. The first gear teeth 88 may have a larger diameter than the second gear teeth 90. In the illustrated embodiment, the sun gear 76 is the input, the ring gear 92 is held stationary (fixed to the housing 44), and the planet carrier 84 is the output. A carrier bearing 85 may include an inner race seated on a nose 87 of the carrier 84 and an outer race seated on the housing 44. The carrier bearing 85 may be a roller bearing having spherical roller elements, e.g. a ball bearing, in the illustrated embodiment. In other embodiments, the carrier bearing 85 may be replaced with a bushing or other type of bearing.

Figure 4:
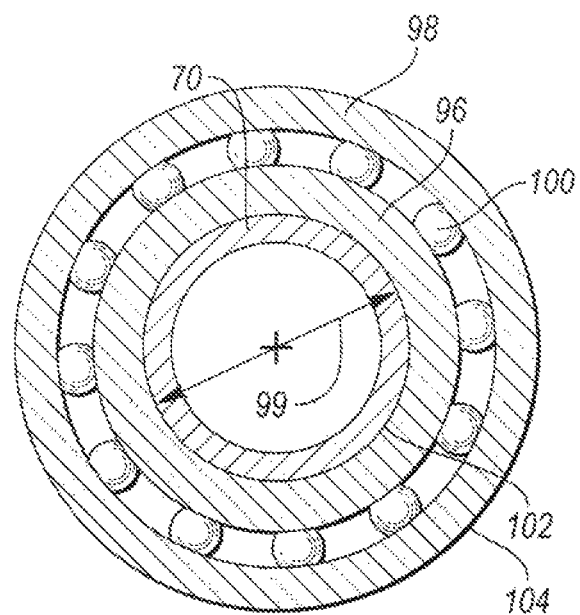
FIG. 4 is a front cross-sectional view of a sun bearing and surrounding area.

Referring to FIGS. 2, 3, and 4, the sun gear assembly 68 is supported by a sun bearing 94. The sun bearing 94 is a ball bearing. The sun bearing 94 includes an inner race 96, an outer race 98, and a plurality of spherical roller elements (balls) 100 disposed between the inner and outer races. The balls 100 may be supported by a cage (not shown). An inner circumferential surface 102 of the inner race 96 is disposed on the inner bearing seat 78 of the sun shaft 70. An outer circumferential surface 104 of the outer race 98 is disposed on an outer bearing seat 106 of the nose 87 of the planet carrier 84. An inner diameter 99 of the inner race 96 is less than an outside diameter of the sun gear 76. Used herein, an "outside diameter" of a gear is measured at the tips of the teeth.

The inner race 96 of the sun bearing 94 may be press fit (interference fit) to the sun shaft 70. Alternatively, the sun bearing 94 may be retained by other means such as a nut. The inner race 96 may be additionally retained between the gear teeth 108 of the sun gear and an annular retainer 112 (e.g., a snap ring). The sun shaft 70 may define a circular groove 110 that receives the retainer 112. A washer 114 may be disposed between the annular retainer 112 and the inner race 96. The outer race 98 may be axially retained between a shoulder 116 and an annular retainer 120 that is received within a circular groove 118 of the outer bearing seat 106.

The sun bearing 94, while providing radial support, is mostly responsible for resisting thrust loads (acting in the axial direction) generated during operation of the drive unit 42. The sun bearing reacts loads of the sun gear 76 into the carrier 84. The sun shaft 70 is pulled towards the planet carrier 84 when the sun shaft 70 rotates in a first direction and is pushed towards the motor 46 when the sun shaft 70 rotates in a second direction. The sun bearing 94 resists these thrust loads and transfers them into the carrier bearing 85 and the ring gear 92. The spline connection prevents axial thrust loads from being transferred from the sun gear 76 to the rotor 54. This allows for smaller motor bearings 62, 64 that are sized to support the motor magnetic forces, which are primarily radial loads and considerably smaller than the sun gear thrust forces. While the sun bearing is described above as part of a single-speed transmission, the sun bearing concept can also be used in a multi-speed transmission such as a two-speed.

Referring back to FIG. 2, the differential 50 may include a pair of opposing side gears 122, 124 and a pair of opposing spider gears 126, 128 meshing between the side gears. The spider gears 126 and 128 may be rotationally coupled to each other by a shaft (not shown). The half shaft 40 is rotationally coupled to the side gear 122 and the half shaft 38 is rotationally coupled to the side gear 124. The rotor shaft 56 and the sun shaft 70 are hollow allowing the half shaft 38 to extend through the drive unit 42 and connect with the side gear 124.

The differential 50 may be at least partially integrated with the planet carrier 84 or may be separate. In the illustrated embodiment, the planet carrier 84 supports the spider gears 126, 128 and the side gear 124. An end case 130 supports the side gear 122 and is attached to the planet carrier 84 by fasteners or the like. A differential bearing 136 is disposed between the end case 130 and the housing 44. The differential bearing 136 cooperates with the carrier bearing 85 to support the differential 50 and the planet carrier 58 for rotation within the housing 44. The differential 50 is illustrated as an open differential but may be a limited slip or other type in different embodiments.

A park gear 132 may be disposed between the sun bearing 76 and the motor bearing 62. A spline connection 134 may rotationally couple the park gear 132 to the sun shaft 70. The park gear 132 may define internal splines that mesh with external splines of the sun shaft 70.

In a conventional powertrain, friction losses of the internal combustion engine substantially overshadow the friction losses associated with the bearings of the transmission and other drive-line components. In contrast, bearing friction losses account for a large percentage of the friction losses in an electric drive unit, such as electric drive unit 42. Drive unit efficiency is paramount to increasing vehicle range. In some instances, a 1% increase in drive unit efficiency corresponds to a 1.7% increase in vehicle range.

In general, larger bearings have a higher load capacity and more losses than smaller bearings. Efficiencies also very across different types of roller bearings. For example, needle trust bearings have a higher load capacity than similarly sized ball bearings but also have greater losses than ball bearings, when loaded axially, due to the sliding losses of the needles. The efficiency of a bearing also depends upon the rotational speed difference between its inner and outer races.

The bearing arrangement of the drive unit 42 optimizes friction losses by adding a fifth bearing, i.e., the sun bearing 94, and optimizing the other bearings accordingly. This is counterintuitive as adding an addition bearing (conventional designs only have four bearings—no sun bearing) typically results in increased friction losses. Adding the sun bearing 94, in conjunction with sun shaft 70, reduced losses for several reasons. Isolating the motor 46 allowed for smaller motor bearings, which as stated above reduces losses. This sized reduction has a particularly large affect here because the motor bearings have the largest speed difference between the inner and outer races. That is, the smallest bearings of the system support the fastest rotating component, the motor 46. The sun bearing 94, while larger to support the thrust loads, has a much smaller speed differential between its inner and outer races due to the fact that the sun shaft 70 and the carrier 84 are both rotating in the same direction albeit at different speeds. For example, the speed difference between the sun gear 76 and the planet carrier 84 may be around 9:1, whereas the inner races of the motor bearings may rotate at 18,000 revolutions per minute versus stationary outer races.

The addition of the sun bearing 94 allows all the bearings to shrink in diameter. In a traditional design, the motor bearing bore must be larger than the sun gear OD, or the sun gear has to include an internal spline under the teeth so that it can be a separate component. Making the motor bearing large enough to slide over the sun gear is less efficient as larger diameter bearings have high losses. Packaging an internal spline is also less efficient because it requires increasing the sun gear diameter, and stepped planet gear sets are sensitive to changes in sun gear diameter. For example, if the sun diameter increases by 1.0 mm, then to maintain the same ratio, the overall gear set diameter would grow by about 4.5 mm. Further, sun diameter is directly proportional to pitch line velocity, which is a major gear noise indicator.

The drive unit 42 is also modular due to the isolation of the motor 46 from the transmission 48, e.g., the spline connection. The sizing of the transmission/differential and the motor can be modified as needed without affecting the other. For example, if another vehicle requires the same transmission/differential but a different motor, then a different motor can be attached to the transmission/differential assembly without substantial redesign. The sun bearing 94, which enables the spline connection between the sun shaft and the rotor shaft, also allows for intermediary components to be installed between the motor and the transmission.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric powertrain comprising:
   an electric machine having a rotor shaft supported for rotation about an axis;
   a planetary gearset supported about the axis and including:
      a sun gear assembly having a sun shaft with a first end connected to the rotor shaft, a second end having a sun gear, and an inner bearing seat disposed therebetween,
      a planet carrier having planet gears and defining an outer bearing seat, wherein at least one of the planet gears meshes with the sun gear, and
      a ring gear meshing with at least one of the planet gears;
   a differential configured to receive power from the planet carrier; and
   a sun bearing supported about the axis and including an outer race disposed on the outer bearing seat, an inner race disposed on the inner bearing seat, and a plurality of spherical roller elements disposed between the inner and outer races, wherein an inner diameter of the inner race is less than an outside diameter of the sun gear, wherein the sun bearing is the only bearing in contact with the sun shaft.

2. The electric powertrain of claim 1, wherein the sun shaft defines a circular groove, and further comprising an annular retainer disposed in the groove, and a washer circumscribing the sun shaft and disposed between the sun bearing and the annular retainer.

3. The electric powertrain of claim 1, wherein the rotor shaft defines an internal spline, and the sun shaft defines an external spline meshing with the internal spine.

4. The electric powertrain of claim 1 further comprising a motor bearing having an inner race seated on the rotor shaft and an outer race seated on a housing of the electric powertrain, wherein an inner diameter of the inner race of the motor bearing is smaller than the inner diameter of the sun bearing.

5. The electric powertrain of claim 1 further comprising:
   a motor bearing having an inner race seated on the rotor shaft and an outer race seated on a housing of the electric powertrain; and
   a park gear seated on the sun shaft between the sun bearing and the motor bearing, wherein the sun shaft defines an external spline and the park gear defines an internal spline meshing with the external spline of the sun shaft.

6. The electric powertrain of claim 1 further comprising a half shaft supported for rotation about the axis and extending through the rotor shaft and the sun shaft.

7. An electric powertrain comprising:
an electric machine having a rotor shaft supported for rotation about an axis;
a planet carrier supported for rotation about the axis and defining an outer bearing seat;
a sun gear assembly supported for rotation about the axis, the sun gear assembly having a sun shaft with a first end rotationally coupled to the rotor shaft, a second end having a sun gear, and an inner bearing seat disposed therebetween; and
a sun bearing supported for rotation about the axis and including an outer race disposed on the outer bearing seat, an inner race disposed on the inner bearing seat, and a plurality of spherical roller elements disposed between the inner and outer races, wherein the sun bearing is the only bearing in contact with the sun shaft.

8. The electric powertrain of claim 7, wherein an inner diameter of the inner race is less than an outside diameter of the sun gear.

9. The electric powertrain of claim 7, wherein the sun shaft defines a circular groove, and further comprising an annular retainer disposed in the groove and a washer circumscribing the sun shaft and disposed between the sun bearing and the annular retainer.

10. The electric powertrain of claim 9 further comprising a carrier bearing having an inner race seated on the planet carrier and an outer race seated on a housing of the electric powertrain.

11. The electric powertrain of claim 10, wherein the carrier bearing circumscribes the washer.

12. The electric powertrain of claim 7, wherein the sun gear is integrally formed with the sun shaft.

13. The electric powertrain of claim 7 further comprising:
a housing;
a ring gear rotationally fixed relative to the housing; and
planet gears supported by the carrier, wherein at least one of the planet gears meshes between the sun gear and the ring gear.

14. An electric powertrain comprising:
a housing;
an electric machine supported in the housing about an axis, the electric machine including a stator, a rotor shaft supported for rotation about the axis, and a rotor fixed to the rotor shaft;
a stepped planetary gearset including:
a sun gear assembly supported for rotation about the axis, the sun gear assembly having a sun shaft with a first end splined to the rotor shaft, a second end having a sun gear, and an inner bearing seat disposed therebetween,
a ring gear rotationally fixed to the housing,
a planet carrier having planet gears each with first teeth in meshing engagement with the sun gear and second teeth in meshing engagement with the ring gear, wherein the planet carrier defines an outer bearing seat,
a differential configured to receive power from the planet carrier;
a sun bearing supported about the axis and including an outer race disposed on the outer bearing seat, an inner race disposed on the inner bearing seat, and a plurality of spherical roller elements disposed between the inner and outer races; and
an electric machine bearing having an inner race seated on the rotor shaft and an outer race seated on the housing, wherein an inner diameter of the inner race of the motor bearing is smaller than the inner diameter of the sun bearing.

15. The electric powertrain of claim 14, wherein the sun shaft defines a circular groove, and further comprising an annular retainer disposed in the groove and a washer circumscribing the sun shaft and disposed between the sun bearing and the annular retainer.

16. The electric powertrain of claim 14, wherein the sun bearing is the only bearing in contact with the sun shaft.

17. The electric powertrain of claim 14 further comprising:
a first half shaft supported for rotation about the axis and extending through the rotor shaft and the sun shaft; and
a second half shaft coaxial with the first axle shaft, wherein the first and second half shafts are operably coupled to the differential.

18. The electric powertrain of claim 14, wherein an inner diameter of the inner race is less than an outside diameter of the sun gear.

19. The electric powertrain of claim 16, wherein an inner diameter of the inner race is less than an outside diameter of the sun gear.

* * * * *